July 27, 1965
G. H. YELINEK ETAL
3,197,029
FILTER
Filed March 23, 1962
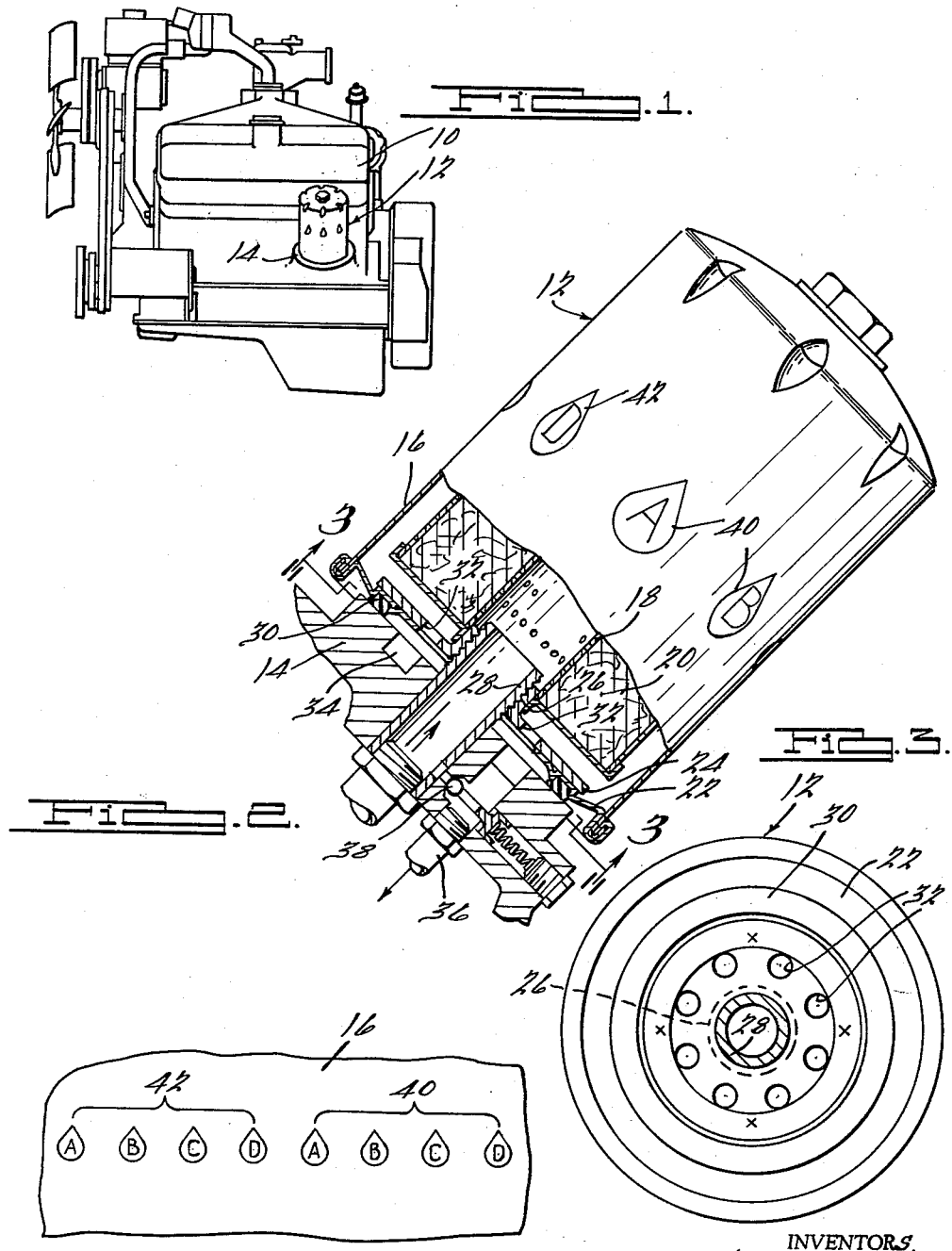
INVENTORS.
Gustav H. Yelinek.
BY Jack R. Giles.
Harness, Dickey & Pierce
ATTORNEYS.

3,197,029
FILTER
Gustav H. Yelinek, Racine, Wis., and Jack R. Giles, Hollins, Va., assignors to Walker Manufacturing Company, a corporation of Delaware
Filed Mar. 23, 1962, Ser. No. 181,937
1 Claim. (Cl. 210—91)

This invention relates to a filter and more particularly to a torque indicator for use with disposable type filter elements and the like to indicate when the element has been properly fastened or secured in place.

Disposable type filter elements such, for instance, as oil filters for automobile engines, are provided with a threaded aperture or nipple adapted to threadedly engage a mating part on the base of the filter assembly. The base of the assembly is either attached to or forms a part of the automobile engine and the filter element is attached by rotating the same relative to the base to engage the threaded mating parts thereof. An annular gasket, usually attached to the filter element, is provided between the base and filter element, and forms a fluid-tight connection therebetween, when the filter element is properly attached to the base. It is essential however that while the threaded connection between these parts be tightened sufficiently to eliminate the possbility of leakage between the base and filter element, excessive tightening of the threaded connection, which might strip the threads on the base or filter element, must be avoided.

It is therefore a principal object of this invention to provide a filter element having torque indicating means associated with the base and/or the filter element for readily indicating when the threaded connection between these parts has been properly tightened.

It has been determined that if the filter element is initially threaded onto the base until contact is established between the gasket and the base, proper attachment may be completed by further rotating the filter element one half a turn or one hundred eighty degrees. This will apply sufficient pressure to the gasket to eliminate the possibility of leakage, but will avoid excessive tightening of the threaded connection which might strip the threads on the base or filter element.

In accordance with this invention, the above objects and advantages are accomplished by providing indicia on the base or filter element, preferably on the latter, which will visually indicate the extent to which the filter element must be rotated to accomplish the final one half turn. The indicia consist of two repetitive sets of signs, symbols, numerals, letters or other marks extending circumferentially around the filter element and so arranged that corresponding marks are located one hunder eighty degrees apart; i.e., diametrically opposite one another. With such an arrangement of indicia the filter element is initially threaded onto the base until contact is established between the gasket and the base; then the position of one indicium or mark (for instance the uppermost) is noted; and then the filter element is rotated further until the same mark appears at the selected or index point. When this occurs, the filter element has been rotated an additional one half turn or one hundred eighty degrees and proper attachment of the filter element to the base is complete.

The invention also contemplates the application of an index point on the base or an arrangement in which the indicia are applied to the base and an index point is provided on the filter element.

The various objects and advantages of the invention and the novel details of one commercially practical embodiment thereof will become more apparent as this description proceeds, especially when considered in connection with the accompanying drawings in which:

FIGURE 1 is a side elevational view of a conventional type V-8 engine showing a disposable type filter element associated therewith;

FIGURE 2 is an enlarged sectional elevational view of a filter element embodying this invention;

FIGURE 3 is a sectional elevational view taken substantially on the plane indicated by line 3—3 in FIGURE 2; and FIGURE 4 is a developed view showing the arrangement of the indicia.

Referring now to the drawings, and particularly to FIGURE 1, it will be noted that there is illustrated a conventional type V-8 engine 10 having a filter element 12 associated therewith. The base 14 of the assembly is either attached to or forms a part of the automobile engine, and the filter element is attached by rotating the same relative to the base to engage threaded mating parts thereof.

In the embodiment of the invention herein illustrated, the filter element 12 is shown as an oil filter, although obviously the invention may find utility in connection with various types of disposable elements attached to a base by the threaded engagement of mating parts thereof.

As shown in FIGURE 2, the oil filter element comprises a shell 16 provided with a centrally disposed perforated pipe or housing 18 and a filter element 20 surrounding the housing 18 and spaced from the inner surface of the shell 16.

The lower end of the filter element is formed with a closure 22 to which is secured a plate 24. The plate 24 is shown as being provided with an internally threaded tubular extension 26 adapted for threaded engagement with an externally threaded conduit or nipple 28 extending from the base 14.

Arranged between the base 14 and the closure 22 and carried by the latter is a washer or gasket 30 adapted to be compressed when the filter element is screwed into place to form a fluid-tight connection between the parts.

In the form of filter element illustrated, the oil flows in through the pipe 28 and outwardly through the perforated housing 18 to the filter 20 and escapes through apertures 32 to an annular groove 34 from which it flows through a conduit 36 back to the engine. A by-pass or pressure release valve 38 is usually provided so that in the event the oil filter becomes clogged, the oil may bypass the filter and return to the engine through pipe 36.

Obviously, the invention is not limited to use in connection with oil filters, nor to the particular type of oil filter herein illustrated. One particular type of oil filter and engine have been shown so as to illustrate an environment in which the invention finds particular utility.

In almost all disposable type filter elements the connection between the element and its base is a threaded one, and it is essential that, while the threaded connection between these parts be tightened sufficiently to eliminate the possibility of leakage, excessive tightening of the threaded connection, which might strip the threads on the base or filter element, must be avoided.

It has been determined that if the filter element is initially threaded onto the base until contact is established between the gasket 30 and the base 14, proper attachment may be completed by further rotating the filter element one half a turn. This will apply sufficient pressure to the gasket 30 to eliminate the possibility of leakage, but will avoid excessive tightening of the threaded connection which might strip the threads on the base or the filter element.

Therefore, in accordance with this invention, indicia are provided on the base or filter element, preferably on the latter, which will visually indicate the extent to which the filter element must be rotated to accomplish the final one half turn.

This indicia consist of two repetitive sets 40 and 42 (see FIGURE 4) of signals, symbols, numerals, letters, or other marks extending circumferentially around the filter element and so arranged that corresponding indicia are located diametrically opposite one another. Thus, the mark "A" in set 40 is arranged 180° from the mark "A" in set 42, the mark "B" in set 40 is arranged 180° from the mark "B" in set 42, and so on.

With such an arrangement of indicia, the filter element is initially threaded onto the base by threadedly engaging the tubular extension 26 with the end of the nipple or pipe 28 until contact is established between the gasket 30 and the base 14. Ordinarily, it is advisable to first apply a film of oil to the gasket, although this is not absolutely essential. After contact has been established between the gasket and the base, the position of one indicium or mark, such, for instance, as the mark "A," which, in FIGURE 2, is shown in the uppermost position, is noted, and then the filter element is rotated further until this same mark "A" in the second set of indicia appears at the selected or index point; i.e., is located in the uppermost position. When this occurs, the filter element has been rotated an additional one half turn, and proper attachment of the filter element to the base is completed. Such additional one half turn has compressed the gasket sufficiently to eliminate the possibility of leakage between the filter element and the base, but the parts have not been tightened enough to cause a stripping of the threads on the base or filter element.

Obviously, the indicia may be applied to the base with an index point on the filter element, although the arrangement of the indicia on the shell of the filter element appears to be the most commercially practical. If desired, an idex point might be provided on the base.

While one commercially practical form of the invention, in one environment, has been described and illustrated in detail, it will be understood that various changes may be made as may come within the purview of the accompanying claim.

What is claimed is:

A screw-on filter element for attachment to a base, said element comprising a cylindrical shell containing a filter and having a closure plate at one end, an annular gasket attached to said plate to be compressed against and form a fluid tight seal with the base, said element including threaded means for engagement with threaded means on said base whereby rotation of the element will screw on and attach the element to the base, said gasket being of a thickness and resilience such and the lead of said threaded means being such that substantially one half turn of said filter element after said gasket first touches said base compresses said gasket to a degree to provide the optimum seal between the gasket and base, and indicia means on said shell comprising at least one pair of indicia located 180 degrees apart for indicating when said shell has been rotated one half turn.

References Cited by the Examiner

UNITED STATES PATENTS

| | | | |
|---|---|---|---|
| 2,151,953 | 3/39 | Zimmerman | 73—139 |
| 2,522,975 | 9/50 | Voorhees | 210—457 |
| 2,733,682 | 2/56 | Langteau | 116—114 X |
| 2,785,804 | 3/57 | Fernandez | 210—91 |
| 2,877,902 | 3/59 | Chase et al. | |

REUBEN FRIEDMAN, *Primary Examiner.*

HERBERT L. MARTIN, *Examiner.*